United States Patent
Herffurth

(10) Patent No.: US 6,173,821 B1
(45) Date of Patent: Jan. 16, 2001

(54) DISK BRAKE PROTECTOR FOR A DISK BRAKE OF A MOTOR VEHICLE WHEEL WITH PERFORATED RIM DISH

(75) Inventor: Rainer Herffurth, Fuldatal (DE)

(73) Assignee: DaimlerChrysler AG, Stuttgart (DE)

( * ) Notice: Under 35 U.S.C. 154(b), the term of this patent shall be extended for 0 days.

(21) Appl. No.: 09/429,037

(22) Filed: Oct. 29, 1999

(30) Foreign Application Priority Data

Oct. 31, 1998 (DE) .............................................. 198 50 257

(51) Int. Cl.[7] ................................ B60T 1/06; F16D 65/00
(52) U.S. Cl. .................................... 188/218 A; 188/18 A
(58) Field of Search .......................... 188/18 A, 218 A, 188/264 A, 264 AA, 264 R

(56) References Cited

U.S. PATENT DOCUMENTS

| | | | |
|---|---|---|---|
| 4,360,083 | * 11/1982 | Weisman | 188/218 A |
| 4,484,667 | * 11/1984 | Bottieri, Jr. | 188/218 A |
| 4,540,069 | * 9/1985 | Bolenbaugh et al. | 188/218 A |
| 5,474,160 | * 12/1995 | Siegrist | 188/264 R |

FOREIGN PATENT DOCUMENTS

| | | |
|---|---|---|
| 3634490A1 | 4/1988 | (DE) . |
| 4344051A1 | 7/1994 | (DE) . |
| 9405158 U | 7/1994 | (DE) . |
| 19512354C1 | 11/1996 | (DE) . |

\* cited by examiner

*Primary Examiner*—Christopher P. Schwartz
(74) *Attorney, Agent, or Firm*—Evenson, McKeown, Edwards & Lenahan, P.L.L.C.

(57) ABSTRACT

A disk brake protector is provided for the brake disk of a motor vehicle wheel of the type with a perforated rim dish fastened directly or indirectly to the steering knuckle or axle housing and covering at least a part of the brake disk. The brake disk protector is located in the space between the disk brake and the wheel rim, covering at least a part of the brake disk friction ring surface and the radial friction ring circumferential surface.

16 Claims, 1 Drawing Sheet

DISK BRAKE PROTECTOR FOR A DISK BRAKE OF A MOTOR VEHICLE WHEEL WITH PERFORATED RIM DISH

BACKGROUND AND SUMMARY OF THE INVENTION

This application claims the priority of German application 198 50 257.5, filed in Germany on Oct. 31, 1998, the disclosure of which is expressly incorporated by reference herein.

The invention relates to a disk brake protector for a disk brake, with a friction ring, of a motor vehicle with a perforated rim dish, said dish being mounted directly or indirectly on the steering knuckle or axle housing and covering at least a portion of the disk brake.

In heavy vehicles used on construction sites that carry loose material, for example, only drum brakes have been used on the rear axles. An important reason for this is the problem, unsatisfactorily solved so far, of encapsulating the disk brakes against loose material entering the wheel rim from the front in side dumpers.

A partially covered disk brake is known from German Patent Document No. DE 43 44 051 A1 in which a disk-shaped protective covering is fastened to a non-rotating axle part. The protective covering however is mounted on the side of the wheel that faces the interior of the vehicle, so that it cannot keep loose material entering the wheel or rim dish from the outside of the vehicle out of the brake system. It also has ventilation slots which cannot keep out loose material containing sand, for example.

The present invention addresses the problem of providing a protector for disk brakes that protects a disk brake system, located at least partially in the interior of the rim, from contamination and/or damage caused by dirt entering the interior of the wheel rim from outside.

The problem is solved by preferred embodiments of the present invention by providing a disk brake protector for a disk brake of a motor vehicle wheel having a friction ring, a perforated rim dish, fastened directly or indirectly to a steering knuckle or axle housing and covering at least a part of the disk brake, wherein the disk brake protector is located at least partially in a space between the disk brake and the wheel rim, said protector covering at least a portion of a surface on an outside of the wheel and a radial circumferential surface adjacent the friction ring of the disk brake.

The disk brake protector is located in the space between the disk brake and the wheel rim, covering at least a portion of the friction ring facing the outside of the wheel and the radial circumferential surface.

In certain preferred embodiments of the invention, the disk brake protector is a sleeve-shaped capsule provided at a short distance along the inside contour of the wheel rim. The capsule is fastened to the steering knuckle directly or on one or more non-rotating parts of a disk brake. Between the rotating wheel rim and the fixed capsule there is an annular gap with an approximately constant thickness. Loose material entering this annular gap thus cannot jam between the disk brake and the wheel rim.

The disk brake protector also prevents loose material, wet sand for example, from coming into direct contact with the friction ring of the disk brake. This is an important advantage because, although the sand does not cause jamming, when the vehicle is at rest it accelerates rust formation on the friction ring. In addition, at the first brake application after contamination, the sand adhering to the friction ring is forced into the rubbing surface of the brake pad. In the course of several subsequent brake applications, the sand grains that have been pushed in grind away the friction disk at a rate above average, causing increased wear.

Other objects, advantages and novel features of the present invention will become apparent from the following detailed description of the invention when considered in conjunction with the accompanying drawings.

BRIEF DESCRIPTION OF THE DRAWING

The single drawing FIGURE is a partial sectional view through a wheel with a disk brake and a disk brake protector, constructed according to a preferred embodiment of the invention.

DETAILED DESCRIPTION OF THE INVENTION

Figure 1:
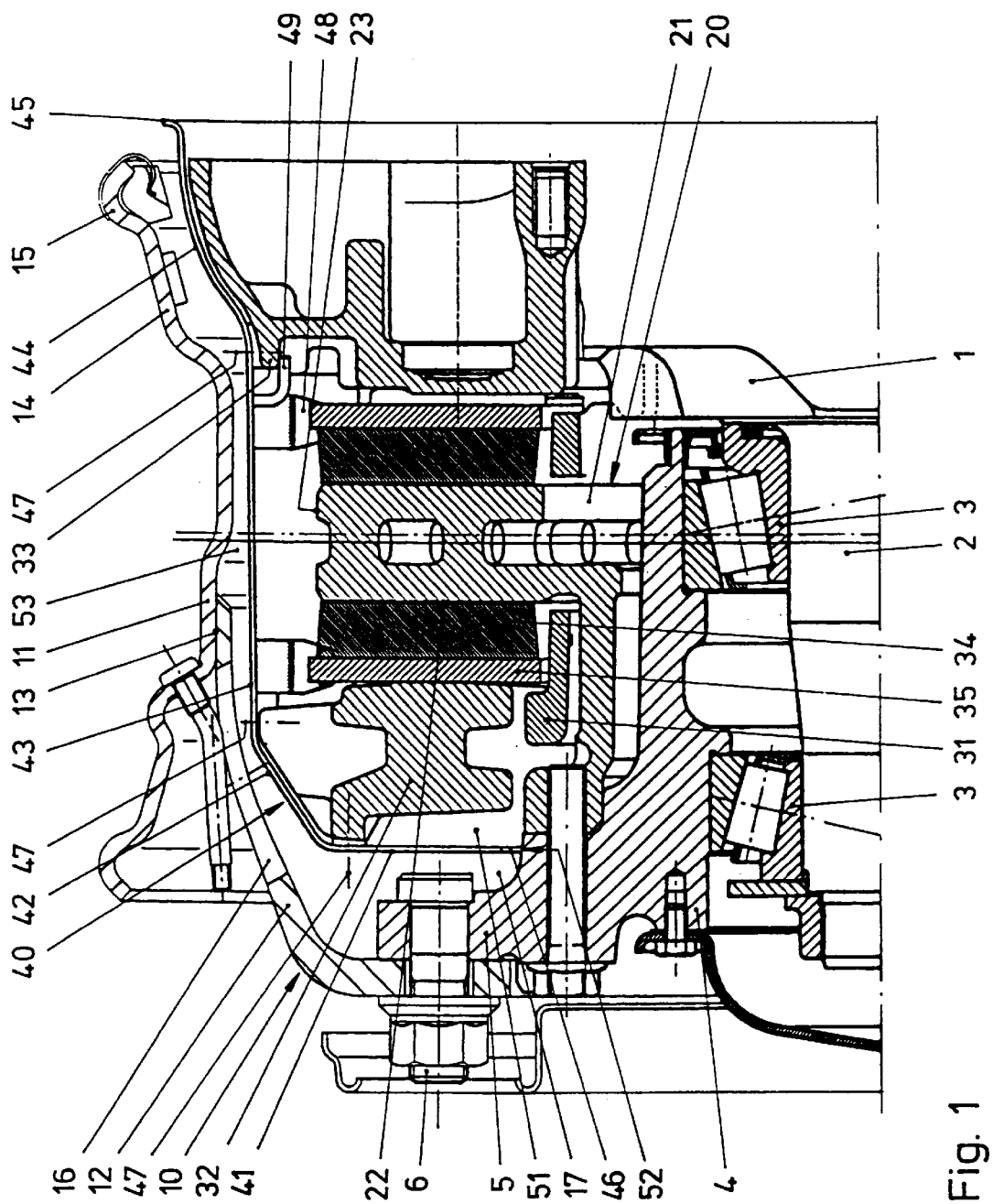

The wheel, which is not driven in the embodiment shown, is mounted by two tapered roller bearings (3) on an stub axle (2) formed on the steering knuckle (1). The tapered roller bearings (3) support a wheel hub (4) which has a wheel hub flange (5) facing the outside of the wheel. An internally ventilated brake disk (20) is fastened to the inside of wheel hub flange (5) while a wheel rim (10) is bolted by wheel bolts (6) to the outside. Wheel rim (10) consists of rim (11) and a rim dish (12) welded to it. The rim dish (12), in the vicinity of weld (13) located between the wheel dish and rim (11), has a plurality of rim openings (16) distributed on the circumference. The openings have a round or oval contour, for example.

The disk brake is shown in the embodiment as a floating caliper brake. The floating caliper brake has a floating caliper (32) which is mounted displaceably in a stator (31) normal to friction ring (21) of brake disk (20). Stator (31) is rigidly fastened to wheel carrier (1). The fastening is not shown in FIG. 1. The brake pads (34), located opposite the side surfaces of friction ring (21) can be seen inside floating saddle or caliper (32).

Brake pads (34) are fastened to plates (35) by which they abut floating caliper (32) and the brake piston(s), not shown. Plates (35) abut hold-downs (48) in the radial direction.

A disk brake protector (40) is located in the interior (17) of the rim. Disk brake protector (40) has a sleeve-shaped contour. It is located in the radial direction between friction ring (21) and rim (11). In the axial direction it is located mainly between friction ring (21) and wheel dish (12). With wheel bearings with an external wheel hub flange (5), as shown the disk brake protector (40) also lies partly between friction ring (21) and wheel hub flange (5).

The disk brake protector (40) shown in the embodiment is divided into four parts (41–44). The first part (41) forms the bottom of the sleeve with one central recess (46) for example. The latter for example is a circular hole whose diameter is a few mm larger than the diameter of the wheel hub at that point. The gap between wheel hub (4) and first part (41) allows air exchange between rim interior 17 and interior (51) of disk brake protector (40). As a rule, while driving, the air pressure in the interior of the rim is lower than in the interior (51) of disk brake protector (40), so that heat can be removed through rim openings (16) and an annular gap (53) between disk brake protector (40) and rim (11).

The second part (42) of disk brake protector (40) has a frustroconical contour. The angle of taper is preferably between 60 and 80 degrees for example.

The following, third part (43) is made cylindrical or at least approximately cylindrical. With the latter design, its diameter increases slightly toward the middle of the axle. This part (43) is located primarily inside rim (11). It covers, among other things, the area of the brake pad (34). The transition between the second (42) and third parts (43) forms the narrowest point between wheel rim (10) and disk brake protector (40). The part (42), relative to wheel rim (10), is located at the transition between rim dish (12) and rim (11). The transition is also located opposite rim openings (16).

The fourth part (44) forms the end of disk brake protector (40) that is oriented toward the middle of the axle. At least areawise, part 44 is approximately parallel to the interior rim shoulder (14), while the diameter visibly increases toward the middle of the axle. Part (44) may project over inner rim flange (15). Here it can terminate in an edge (45) that expands radially. The edge (45) increases dimensional stability and reduces the risk of injury when working on the brake system.

In the embodiment shown, the shortest distance between an outside contour of the disk brake protector (40) and an inside contour of the wheel rim (10) is in the vicinity of rim openings (16) of the wheel rim (10).

In the embodiment shown, the disk brake protector (40) is designed as a two-piece sheet metal body rotationally symmetrical to the wheel axis. Plastics with or without fabric inserts can be used as material. The disk brake protector (40) is divided centrally and parallel to its rotational axis. At a first parting line, for example, in cylindrical part (43) a hinge is located whose parts do not project radially beyond the outside contour of the entire part.

Disk brake protector (40) is fastened for example to the floating saddle (32) of the disk brake. For this purpose it is bolted radially and/or axially at several points (47) to floating saddle (32). The second parting line in disk brake protector (40) is located in the vicinity of floating saddle (32). Direct fastening to the extensive outside contour of floating saddle (32) enables the two half shells on floating saddle (32) to fit flush against one another. At the same time, with this type of fastening in a metal disk brake protector (40), the protector also serves as an additional cooling surface.

To facilitate replacement of brake pads (34), hold-downs (48) of brake pads (34) are located at disk brake protector (40) in the embodiment shown. As a result, the usual hold-down clamps required there are eliminated.

In the vicinity of hold-down (48) oriented toward the middle of the axle, a hook (49) is fastened to each half shell of disk brake protector (40), said hook fitting beneath a projection (33) of brake saddle (32) during assembly. With the aid of this hook (49) disk brake protector (40) can be temporarily secured during assembly before it is bolted to brake saddle (32).

Disk brake protector (40) provides especially good protection in commercial vehicles that can dump loose material, etc. to the side. For example, with side tipping of sand, gravel, asphalt, soil, and comparable construction materials the loose material as a rule passes through rim openings (16) of the wheels on the rear axle into the interiors (17) of the wheel rims located there. In rim interior (17) the loose material collects in front of disk brake protector (40), particularly in the first (41) and second (42) parts. Only a small amount of fine-grained loose material remains behind in chamber (51) behind disk brake protector (40), passing through the relatively small gap (52) between part (41) and the wheel hub (4). This amount falls into the lower interior area of disk brake protector (40) when the vehicle begins moving. From there it drops to the road. There are no obstacles to block the loose material since no parts of the brake system are located close to the road in the area below steering knuckle (1).

The loose material which is initially located between rim dish (12) and disk brake protector (40) is distributed through the interior (17) of the rim as the vehicle begins to move. A portion immediately falls through downwardly oriented rim openings (16) to the road. The remaining loose material is thrown out through rim openings (16) with increasing rpm. This also applies to gravel. Larger pieces of gravel do not enter annular gap (53) since they are forced into rim openings (16) through the narrow transitions between the second and third parts.

Smaller pieces of loose material that get between the third part (43) of disk brake protector (40) and the rim well cannot remain there since they are forced at an angle to the direction of travel by the airflow between the turning rim (11) and non-rotating disk brake protector (40). Secondly, in the embodiment shown, floating saddle (32) moves together with the disk brake protector (40) during all brake applications, likewise transversely to the direction of travel, opposite rim (11).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disk brake protector for a disk brake of a motor vehicle wheel having a friction ring and a perforated rim dish, the disk brake protector capable of being fastened directly or indirectly to a steering knuckle or axle housing and capable of covering at least a part of the disk brake, wherein the disk brake protector is located in use at least partially in a space between the disk brake and the wheel rim, said protector substantially covering both a side surface and a radial circumferential surface of the friction ring of the disk brake.

2. Disk brake protector according to claim 1, wherein the disk brake protector has a sleeve-shaped contour, with a recess in a floor area of the contour whose diameter is larger than an area of the wheel hub that penetrates the recess.

3. Disk brake protector according to claim 1, wherein the shortest distance between an outside contour of the disk brake protector and an inside contour of the wheel rim is in the vicinity of rim openings of the wheel rim.

4. Disk brake protector according to claim 3, wherein the disk brake protector includes a transition in the vicinity of the shortest distance from a tapered section to a cylindrical contour.

5. Disk brake protector according to claim 1, wherein the disk brake protector is fastened to a caliper of the disk brake.

6. Disk brake protector according to claim 5, wherein the caliper is a floating saddle.

7. Disk brake protector according to claim 5, wherein the disk brake protector has projecting hold-downs on its inside contour for radially securing brake pads.

8. A vehicle wheel assembly and brake assembly comprising:

a brake disk including a friction ring and brake disk friction pads operably engageable with the friction ring during braking operations, a wheel hub supporting the friction ring, a perforated wheel rim connected to rotate with the wheel hub and circumferentially surrounding the friction ring and friction pads, and a brake disk protector interposed between the wheel rim and the brake disk, said brake disk protector substantially covering the brake disk in both axial and radial directions.

9. An assembly according to claim 8, wherein said brake disk protector is composed of sheet material.

10. An assembly according to claim 8, wherein the disk brake includes a floating caliper assembly supporting the brake disk friction pads, and wherein the brake disk protector is supported at the floating caliper assembly.

11. An assembly according to claim 9, wherein the disk brake includes a floating caliper assembly supporting the brake disk friction pads, and wherein the brake disk protector is supported at the floating caliper assembly.

12. An assembly according to claim 11, wherein the disk brake protector has a sleeve-shaped contour, with a recess in a floor area of the contour whose diameter is larger than an area of the wheel hub that penetrates the recess.

13. An assembly according to claim 11, wherein the shortest distance between an outside contour of the disk brake protector and an inside contour of the wheel rim is in the vicinity of rim openings of the wheel rim.

14. An assembly according to claim 13, wherein the disk brake protector includes a transition in the vicinity of the shortest distance from a tapered section to a cylindrical contour.

15. A disk brake protector for a vehicle wheel and brake assembly of the type including a brake disk including a friction ring and brake disk friction pads operably engageable with the friction ring during braking operations, a wheel hub supporting the friction ring, a perforated wheel rim connected to rotate with the wheel hub and circumferentially surrounding the friction ring and friction pads;

wherein said disk brake protector being configured to be interposed between the wheel rim and the brake disk, said brake disk protector substantially covering the brake disk in both axial and radial directions.

16. A disk brake protector for a vehicle wheel and brake assembly of the type including a brake disk including a friction ring and brake disk friction pads operably engageable with the friction ring during braking operations, a wheel hub supporting the friction ring, a perforated wheel rim connected to rotate with the wheel hub and circumferentially surrounding the friction ring and friction pads;

wherein the disk brake protector is located in use at least partially in a space between the brake assembly and the wheel rim, said protector substantially covering both a side surface and a radial circumferential surface of the friction ring of the brake assembly.

* * * * *